United States Patent [19]

Yamada

[11] Patent Number: 5,026,287
[45] Date of Patent: Jun. 25, 1991

[54] THREE-DIMENSIONAL CONSTELLATION MODEL AND CONSTRUCTION KIT THEREOF

[76] Inventor: Shiro Yamada, No. 2-7-1-606, Mita, Mita Minato-ku, Tokyo, Japan

[21] Appl. No.: 483,615

[22] Filed: Feb. 21, 1990

[30] Foreign Application Priority Data

Mar. 20, 1989 [JP] Japan .................................. 1-66371

[51] Int. Cl.⁵ ............................................. G04B 27/00
[52] U.S. Cl. .................................. 434/137; 434/287; 434/289; 446/488
[58] Field of Search ............... 434/131, 137, 284, 287, 434/289; 446/108, 488, 486

[56] References Cited

U.S. PATENT DOCUMENTS

| | | | |
|---|---|---|---|
| 316,087 | 4/1885 | Washington | 434/137 |
| 630,604 | 8/1899 | Goldthwaite | 434/137 |
| 1,422,642 | 7/1922 | Walters | 434/131 |
| 1,804,829 | 5/1931 | Garrigue | 434/137 |
| 2,135,287 | 11/1938 | Houston | 434/287 |
| 2,354,381 | 7/1944 | Kennedy | 434/137 |
| 2,369,103 | 2/1945 | Clark | 434/135 |
| 2,372,487 | 3/1945 | Hagner | 434/289 X |
| 2,402,194 | 6/1946 | Wolfe | 434/289 X |
| 3,248,807 | 5/1966 | Janus | 434/135 |
| 3,578,331 | 5/1971 | DeGast | 434/131 X |
| 3,584,400 | 6/1971 | Voges | 446/488 X |
| 4,271,604 | 6/1981 | Rowsey, Jr. | 434/289 |

FOREIGN PATENT DOCUMENTS

| | | | |
|---|---|---|---|
| 1030423 | 1/1951 | France | 434/131 |
| 295591 | 12/1986 | Japan . | |
| 342886 | 2/1931 | United Kingdom | 434/289 |
| 919008 | 2/1963 | United Kingdom | 434/289 |

Primary Examiner—Richard J. Apley
Assistant Examiner—Rachel M. Healey
Attorney, Agent, or Firm—Browdy and Neimark

[57] ABSTRACT

A construction kit for building a three-dimensional constellation model is disclosed for viewing of celestial maps. The kit includes a combination of (a) a zenith section having an external shape of a circular form, the back side of said zenith section having a celestial map of the zenith; (b) 6- to 24-in-a-set body plate sections each having a ship's bottom-like shape, each of said body plate sections including an overlap width on its upper edge for bonding to the zenith section, overlap widths on both its right and left edges for forming rib-like projections and an overlap width on its bottom edge for forming an annular flange, each plate section having a celestial map on its back side; (c) a flange-reinforcing plate adapted to bond together the overlap widths provided on the bottom edges of the adjacent body plate sections and (d) reinforcing plates for the rib-like projections to provide greater rigidity and strength to the completed model.

8 Claims, 4 Drawing Sheets

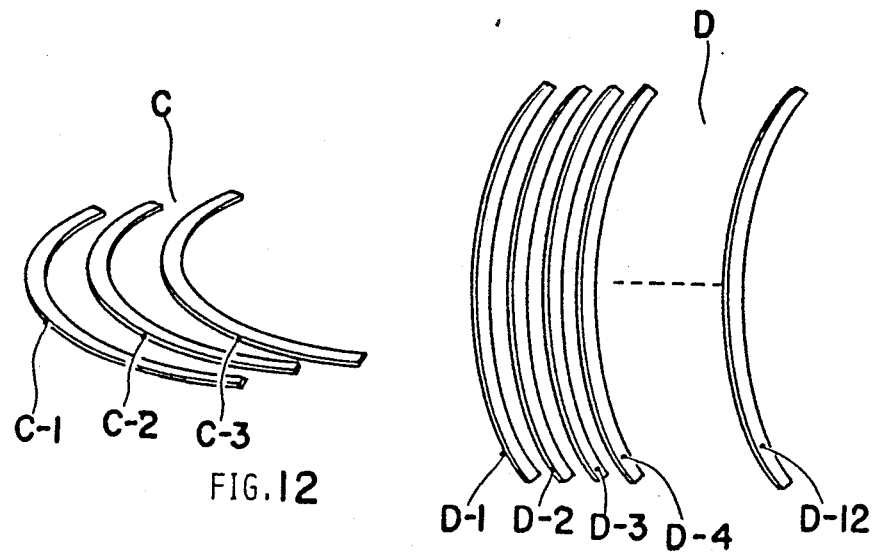
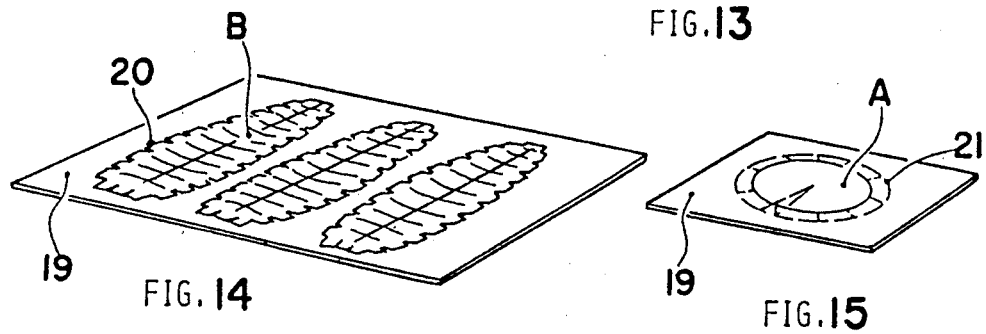
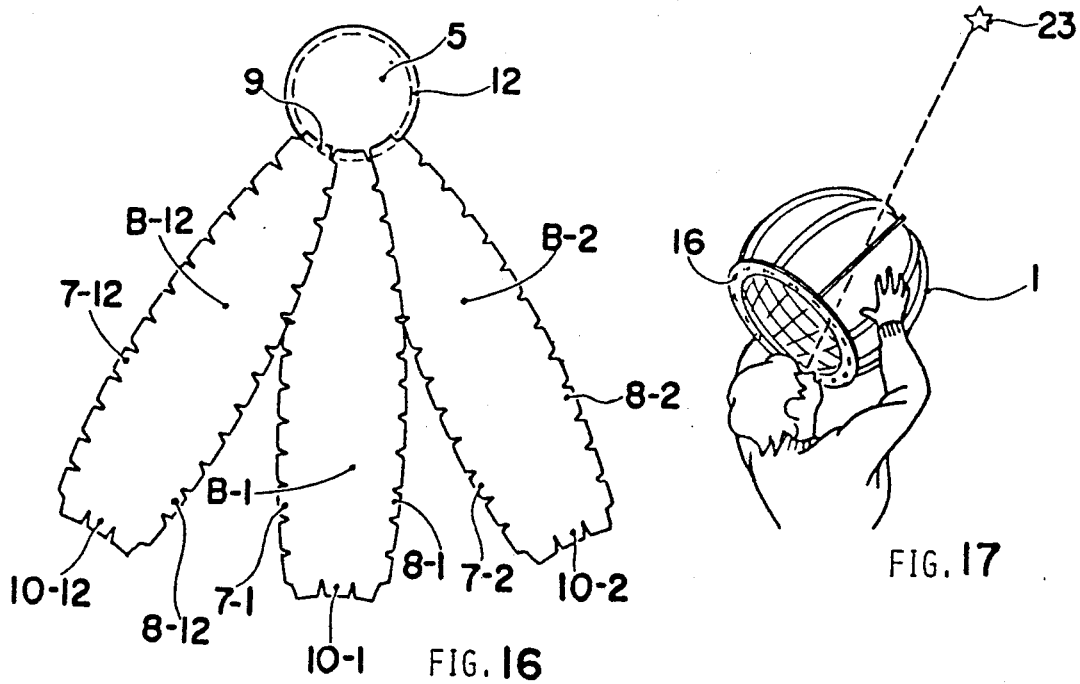

THREE-DIMENSIONAL CONSTELLATION MODEL AND CONSTRUCTION KIT THEREOF

BACKGROUND OF THE INVENTION

The present invention relates to a three-dimensional constellation model for learning positions, names and others of fixed stars and constellations and a construction kit for assembling such a model.

In general, constellation maps for learning positions, names and others of constellations are two-dimensionally drawn on one sheet of paper, so that it is very difficult to find positions of constellations and stars even when compared with actual stars in the night sky.

In more recent years, there has been proposed a celestial globe, wherein a celestial map has been expressed on the inner surface of a spherical shell, adapted to learn positions and names of fixed stars and constellations by looking into the interior of the spherical shell through an observation window defined at its bottom to compare the celestial map with actual stars in the night sky (see Japanese Patent Laid-Open No. 295591.

The spherical shell comprising a main body of the known celestial globe described above is made of a relatively rigid material such as a metal sheet, plastic or board as described in the specification thereof. It is also described in the above known reference to make the spherical shell and observation window up to a flexible material such as a paper or plastic sheet and to inflate the material like a balloon upon its use. Particular production machines and tools or expert skills are however required to produce such a spherical shell.

OBJECT AND SUMMARY OF THE INVENTION it is an object of the present invention to provide economically a three-dimensional constellation model which allows to lightly assemble from paper or a paper-like sheet such as a soft plastic sheet even by children at home without using particular machines and tools and has a lightweight three-dimensional structure extremely high in mechanical strength.

It is another object of this invention to provide a three-dimensional constellation model which has a three-dimensional structure having an extremely high mechanical strength in spite of use of a relatively thin material such as Kent paper or a foamed plastic sheet.

It is a further object of this invention to provide a construction kit of a three dimensional constellation model, which can lightly assemble a lightweight three-dimensional constellation model high in mechanical strength from paper or a paper-like material such as plastic sheet without particular machines and tools.

In order to attain the above-described objects, the three-dimensional constellation model of this invention is constituted in the following manner. Namely, the three-dimensional constellation model contains a plurality of rib-like projections provided protuberantly along the circle of right ascension on the surface of a spherical shell having an opening at its bottom and an annular flange provided protuberantly along the peripheral edge defining the opening, the inner surface of said spherical shell being drawn with a celestial map including fixed stars and constellations, in which the apex of the spherical shell is decided as the North Pole or South Pole.

By the way, in order to find the azimuth of the three-dimensional constellation model of this invention upon its use, calendar days in the observation standard time for indicating the seasonal positions of the constellations drawn on the inner surface of the spherical shell are written on and along the peripheral edge defining the opening of the spherical shell.

The number of the above-described rib-like projections is suitably 6–24 because the production becomes difficult when they are too much and the maintenance of the shape and mechanical strength of the spherical shell becomes difficult if they are too few on the contrary. Twelve projections are particularly preferred.

The following process is used in order to make such a three-dimensional constellation model.

There are provided (a) a zenith section having an external shape of a circular form, the back side of said zenith section being drawn with a celestial map of a zenith part, (b) 6- to 24-in-a-set body plate sections having each a ship's bottom-like shape, each of said body plate sections being provided with an overlap width for bonding to the zenith section on its upper edge, overlap widths for forming rib-like projections on its both right and left edges and an overlap width for forming an annular flange on its bottom edge, and being drawn with a serial celestial map on its back side, and (c) a flange-reinforcing plate adapted to bond together the overlap widths provided on the bottom edges of the adjacent body plate sections thereto. The body plate sections are first of all arranged radially on the periphery of the zenith part formed of the zenith section so as to separately bond the overlap widths provided on the upper edges of the body plate sections to the periphery of the zenith part, and the overlap width provided on both right and left edges of the body plate sections are separately folded in the direction of the front surface of each body plate section to bond in order together the opposite overlap widths of the adjacent body plate sections while forming rib-like projections protuberant along the circle of right ascension on the surface of the sphere to be formed, thereby constructing a spherical shell having an opening at the bottom thereof. The overlap widths protuberantly provided on the bottom edges of the body plate sections are then folded separately in the direction of the front surface of each body plate section to bond together the overlap widths of the adjacent body plate sections by the flange-reinforcing plate, thereby forming a flange.

As a calendar for indicating the seasonal positions of the constellations drawn on the inner surface of the spherical shell, letters expressing months and days are last of all written on and along the peripheral edge defining the opening of the spherical shell, leading to completion of the model.

Of course, such a calendar may be printed on the flange, flange-reinforcing plate, bottom edges of the body plate sections or the like in advance. In addition, a hanger or the like for suspending the three-dimensional constellation model may suitably be attached. Incidentally, as the zenith section of (a), various modifications are considered. For example, (1) a paper or paper-like sheet in the form of a circular disc is used as is, (2) a nick is radially cut in the paper or paper-like sheet in the form of the circular disc to form a V-shaped overlap width and (3) the paper or paper-like sheet in the form of the circular disc is divided into 2–6 parts to form overlap widths along the parting lines of the thus-divided parts.

When the diameter of the spherical shell is relatively small as 20 cm or less than the zenith part of a declination up to ±80° is constructed, the paper or paper-like disc of (1) may be sued.

When the spherical shell has a diameter larger than 20 cm and the range of the zenith part includes a declination up to ±70°, the zenith section of (2) or (3) is used. If such a section is used, an extremely-flattened cone can be formed. In addition, if portion of the spherical shell is constructed from this zenith part, one is insensible to artificiality.

By the way, in order to form such a short cone, a V-shaped piece may be cut out of the paper or paper-like disc along lines extending to its center so as to shorten its circumferential length by 3-6° to bond its cut edges to each other.

The flange-reinforcing plate is made of an annular cardboard having the same inner diameter as the peripheral edge of the opening defined at the bottom of the spherical shell. It is however desirable to divide the plate into 3-4 pieces in order to improve its assembly workability and to save a pasteboard for cutting the plate out of it.

The rib-like projections formed by sticking the overlap widths on the surface of the three-dimensional constellation model is sufficient by itself to maintain the mechanical strength of the spherical shell. It is however highly desirable to fix reinforcing plates to the rib-like projections so as to substantially reinforce projections and the mechanical strength of the spherical shell. The reinforcing plates for the rib-like projections are made of a semiarched cardboard in the same form as the rib-like projection. They are then adhesively fixed on one or both sides of the rib-like projections to reinforce them.

Although an optional means such as an adhesive, staple or Cello-Tape may be used for the bonding of each overlap width, it is preferred in enhancement of assembly workability that an adhesive is applied on the overlap width in advance and release paper is then attached to the adhesive.

Besides, it is preferred that one of opposite overlap widths is made small in size to form an inserting overlap width while a slit is defined at the center of an fold of the other larger overlap width so that the inserting overlap width is inserted into the slit of the other overlap width to assemble in order the rib-like projections because the alignment of the overlap widths can be exactly conducted and the strength of the spherical shell is also enhanced.

A construction kit of a three-dimensional constellation model according to this invention comprises a combination of (a) a zenith section having an external shape of a circular form, the back side of said zenith section being drawn with a celestial map of a zenith part of the zenith part; (b) 6- to 24-in-a-set body plate sections having each a ship's bottom-like shape, each of said body plate sections being provided with an overlap width for bonding to the zenith section on its upper edge, overlap width for forming rib-like projections on its both right and left edges and an overlap width for forming an annular flange on its bottom edge, and being drawn with a serial celestial map on its back side; and (c) a flange-reinforcing plate adapted to bond together the overlap widths provided on the bottom edges of the adjacent body plate sections thereto. It is desired that (d) reinforcing plates for the rib-like projections are added further to this construction kit of the three-dimensional constellation model if needed.

Each of the construction kits of the three-dimensional constellation models according to this invention is marketed by suitably putting the sections of (a), (b) and (c) and (d), which have been cut out in advance as described above, into a bag or the like. There may however by marketed, as kits, those with the above-described sections printed on a layout sheet so as to allow them to cut to by scissors and those with perforations provided along the contours of the above printed sections so as to allow them to easily separate with fingers.

Since the three-dimensional constellation model according to this invention has been provided with a plurality of rib-like projections along the circle of right ascension on the surface of a spherical shell and an annular flange along the peripheral edge defining an opening at the bottom of the spherical shell, an extremely high-mechanical-strength spherical shell can be constructed even when using a relative thin paper web, for example, Kent paper, or a paper-like soft material such as a plastic film. In addition, since the spherical shell is as light as it can easily be held with one hand, an extremely lightweight three-dimensional constellation model can be made with ease.

Furthermore, since the spherical shell is constructed in such a manner that the overlaps widths provided protuberantly on both side edges of the body plate sections are separately folded outside and adjacent overlap widths are bonded to each other, its assembly operation is extremely easy nd an extremely high-strength spherical shell can also be obtained.

BRIEF DESCRIPTION OF THE DRAWINGS

FIGS. 3 2nd 4 illustrate an example of a zenith part, and are plan and perspective views thereof, respectively.

FIG. 12 is a perspective view of flange-reinforcing plates.

FIG. 13 is a perspective view of rib-like projection-reinforcing plates.

FIG. 14 is a perspective view of a sheet for a construction kit to be cut out.

FIG. 15 is a perspective view of a sheet for a construction kit capable of perforating.

FIG. 16 is a perspective view for describing an assembly process of a three-dimensional constellation model.

FIG. 17 is a perspective view for describing how to use the three-dimensional constellation model.

DESCRIPTION OF THE PREFERRED EMBODIMENTS

Figure 1:
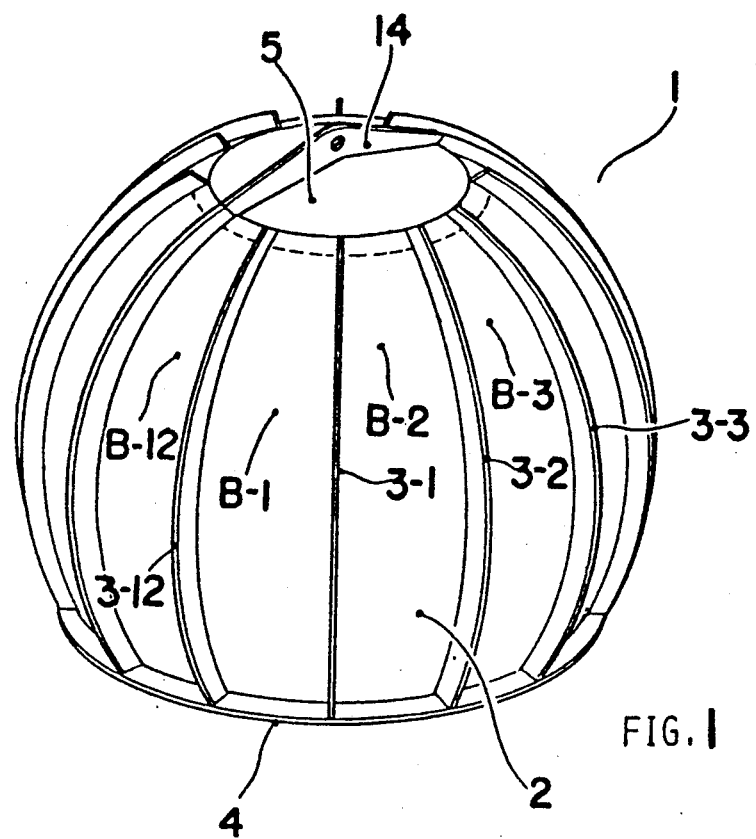
FIG. 1 is a perspective view showing a three-dimensional constellation model of an example of this invention and FIG. 2 is a cross-sectional view of the three-dimensional constellation model illustrated in FIG. 1.
Figure 2:
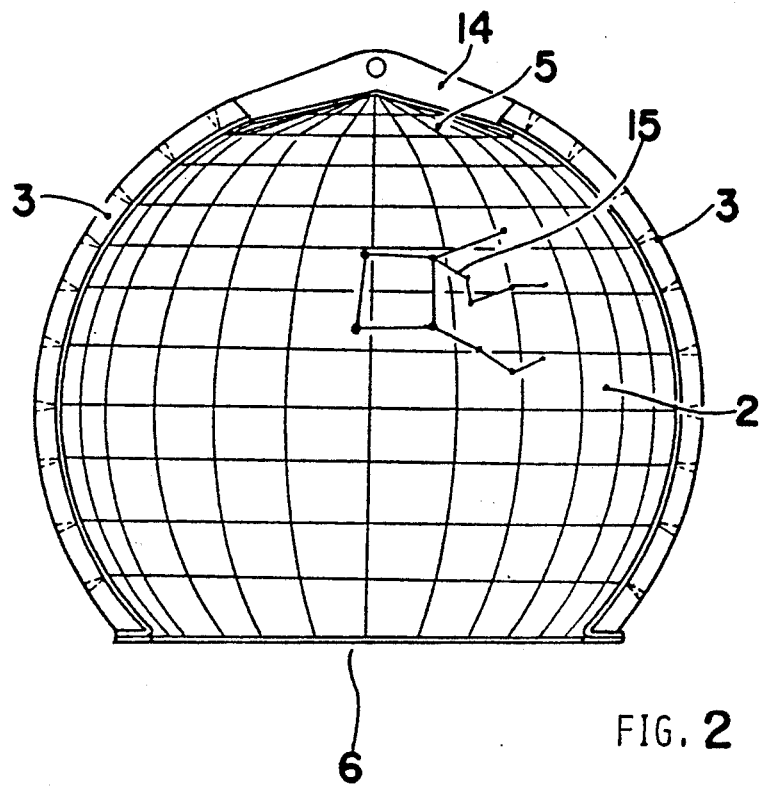

In FIGS. 1 and 2, a three-dimensional constellation model according to this invention. Numeral 2 indicates a spherical shell constituting a main body of the three-dimensional constellation model 1 and having an opening 6 at the bottom. Plural rib-like projections (12 projections in this example) 3-1, 3-2 . . . 3-12 are provided protuberantly along the circle of right ascension on the surface of the spherical shell 2. An annular flange 4 is provided along and outside the peripheral edge defining the bottom opening 6. As illustrated in FIG. 2, a celestial map 15 including fixed stars and constellations, in which the apex of the spherical shell is decided as the North Pole or South Pole, is drawn on the inner surface of the spherical shell. Letters 16 expressing months and days which indicate the calendars corresponding to the constellations drawn on the inner surface are written on and along the peripheral edge defining the opening 6 of the spherical shell 2.

Although the celestial map to be printed on the inner surface of the spherical shell 2 may be printed with a black color on a white ground, it is effective to print with a white color, particularly, a fluorescent paint on a black ground because the map becomes more clear.

In addition, when the celestial map is printed with the white color on the black ground and holes proportional to the apparent magnitudes of stars are separately made in the portions of the stars, one can feel that stars in the night sky are actually observed.

A hanger 14 is further attached to the upper portion of the spherical shell 2 by joining its both ends to both upper ends of two rib-like projections.

Figure 3:
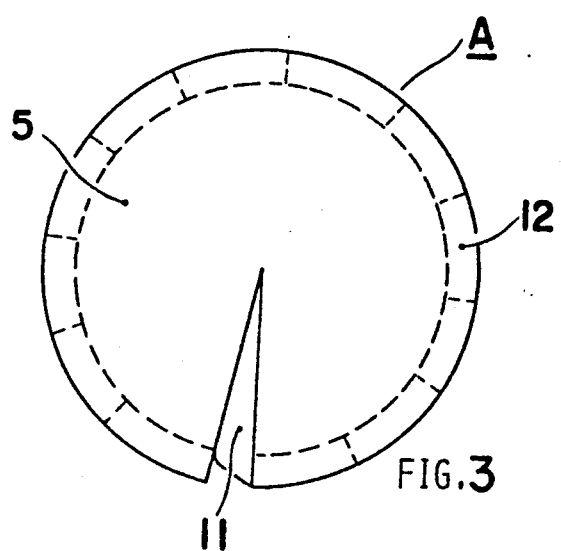
Figure 4:
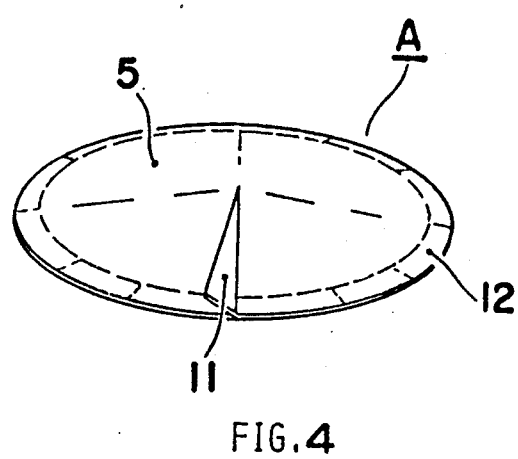
Figure 5:
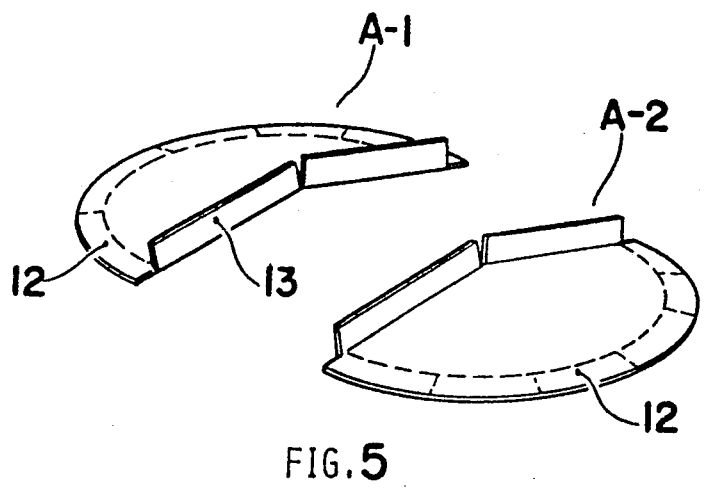
FIG. 5 is a perspective view showing another example of the zenith part.

A construction kit for making a three-dimensional constellation model according to this invention comprises a zenith section A illustrated in FIGS. 3 through 7 and having an external shape of a circular form, the back side of said zenith section being drawn with a celestial map; 12-in-a-set body plate sections B-1, B-2, . . . B-12 depicted in FIG. 8 and having each a ship's bottom-like shape, each of said body plate sections being provided with an overlap width 9 for bonding to the zenith section A on its upper edge, overlap widths 7 and 8, which are divided into plural pieces, for forming rib-like projections 3 on its both right and left edges, and an overlap width 10 for forming an annular flange on its bottom edge, and being drawn with a serial celestial map 15 on its back side; and three flange-reinforcing plates C-1, C-2, C-3 shown in FIG. 12 and adapted to bond together the overlap widths provided on the bottom edges of the adjacent body plate sections thereto. Of course, this kit may suitably be added with a hanger 14, an adhesive, a cutter, etc. in addition to reinforcing plates D-1 to D-12 for the rib-like projections, which are illustrated in FIG. 13. As the zenith section A, there are, for example, a zenith section wherein a nick is cut radially in a paper or paper-like disc, as depicted in FIG. 3, so as to form a V-shaped overlap width 11 and a zenith section in which overlap widths 13 are formed on straight-line portions of two semicircular paper or paper-like sheets A-1 and A-2 as shown in FIG. 5. In order to form a zenith part 5 of ±70° or higher declination, the whole circumferential length of each zenith section may be shorten by about 4° beforehand because a flattened cone similar to a curved surface of a sphere having a declination of ±70° or higher is obtained when the overlap widths of the zenith section are bonded.

Figure 6:
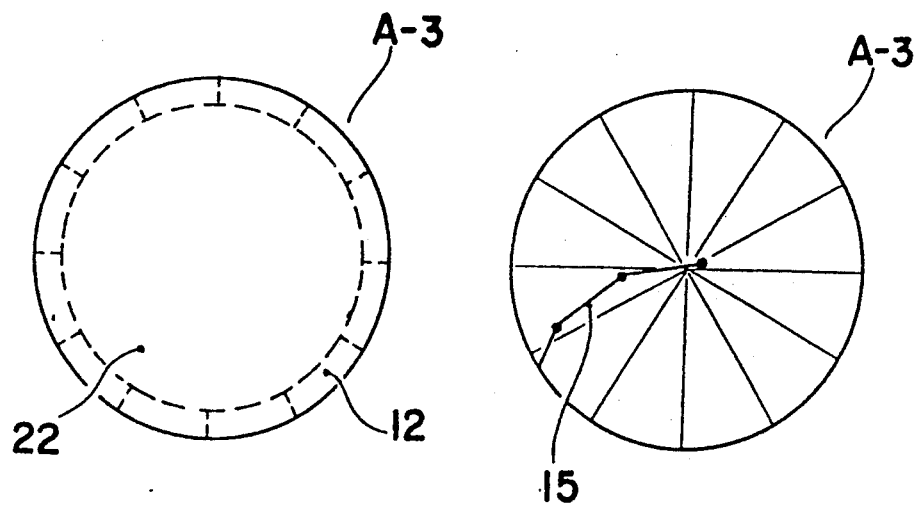
FIGS. 6 and 7 are plan and perspective views, respectively, showing a further example of the zenith part.
Figure 7:
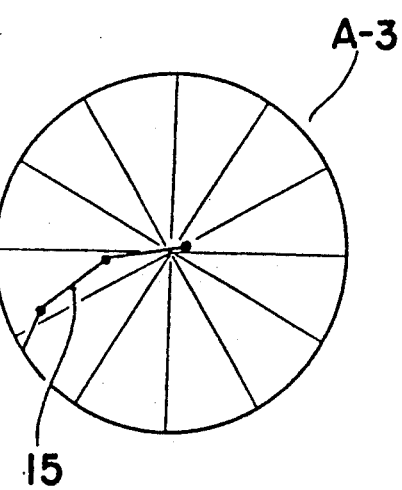

Incidentally, when the diameter of the three-dimensional constellation model is relatively small as 20 cm or less, a paper of paper-like disc 22 in which a celestial map 15 of the zenith part has been printed on its back side, as illustrated in FIGS. 6 and 7, may be used, as a zenith section A-3, as is. In this instance, the zenith part is preferably limited to ±80° or higher declination.

Figure 9:
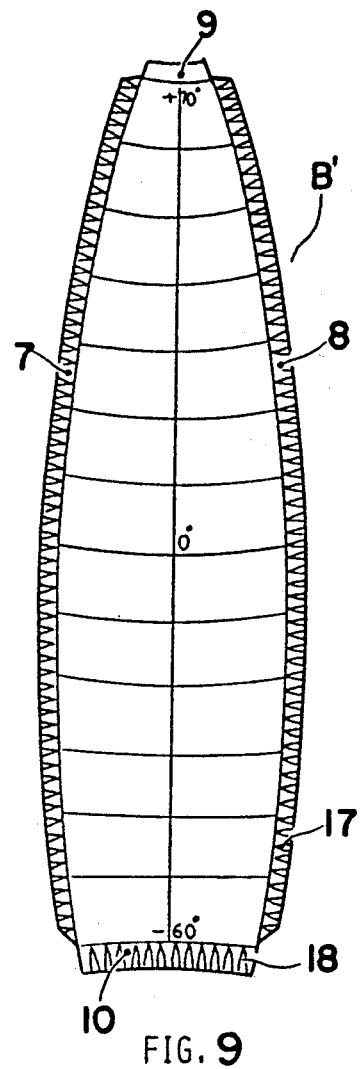

As a modification of the body plate sections, each of body plate sections B' shown in FIG. 9 is used. This section is provided with gathers 17, 18 at the overlap widths 7, 8 of both right and left edges and the overlap width 10 of the bottom edge by a press working. By the provision of the gathers 17, 18, the overlap width 7, 8, 10 can be folded at a right angle to the spherical surface even when the body plate section B' is curved.

Figure 10:
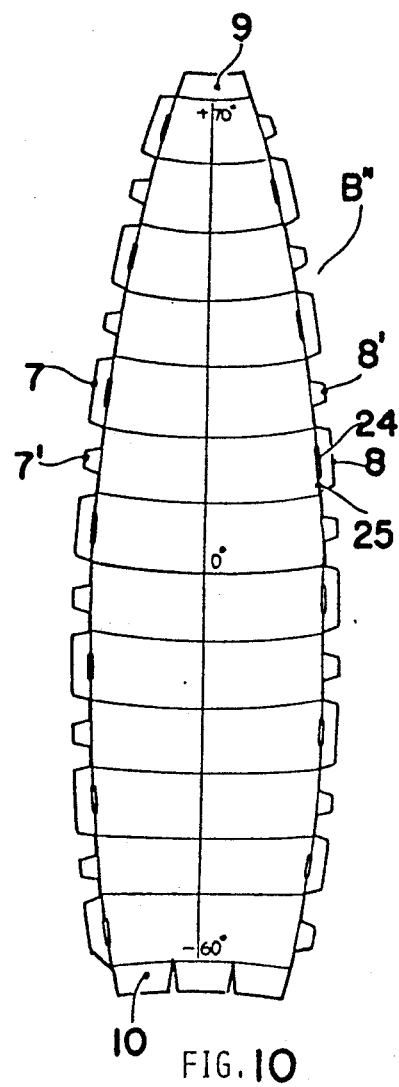
Figure 11:
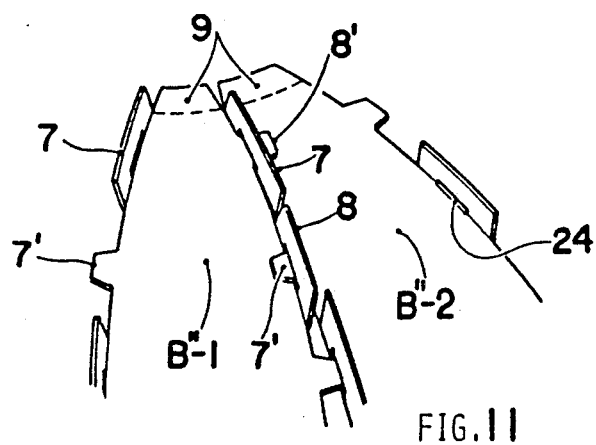
FIG. 11 is a perspective view for describing an assembly process when using the body plate sections of FIG. 10.

As another modification of the body plate sections, each of body plate sections B" depicted in FIG. 10 is used. This section is obtained by making one of the opposite overlap widths of both right and left edges small to form an inserting overlap width 7' and defining a slit 24 at the center of a fold 25 of the other overlap width 8. Upon the assembly of the body plate sections, the inserting overlap width 7' of the adjacent body late section B"-12 is inserted into the slit 24 of the overlap width 8 of the body plate section B"-1. The overlap width 7' inserted is folded upward and stuck on the overlap width 8.

It is extremely effective in enhancing the strength of the spherical shell that the overlap widths 7 or 8 having the slit 24 and the inserting overlap widths 7' or 8' are alternately provided along one side of the body plate section. In this case, it is properly necessary that the overlap widths 7 or 8 having the slit 24 and inserting overlap widths 8' or 7' of the right and left overlap widths has a positionally opposite relationship to each other.

As a construction kit, there can be provided sheets 19 in which a zenith section A (or A-1 and A-2 or A-3), body plate sections B (or B' or B") and flange-reinforcing plates C and optionally, reinforcing plates D for rib-like projections, which are all constituted as described above, have been printed on paper to define cutting lines as illustrated in FIG. 14. In this instance, it is preferred that the zenith section A and body plate sections B are printed on a thin paper web such as Kent paper and the flange-reinforcing plates C and rib-like projection-reinforcing plates D are printed on a thick paper web such as a cardboard.

In order to save the trouble of cutting out them by scissors, it is a great convenience of users to provide perforations 21 along their cutting lines beforehand as shown in FIG. 15.

These construction kits are displayed in the shop windows, for example, by putting them into bags and/or temporarily fixing them on ground paper.

Figure 8:
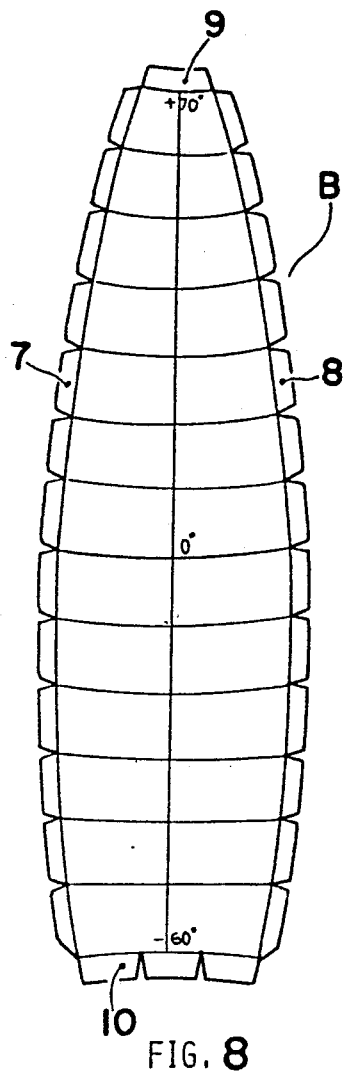
FIGS. 8, 9 and 10 all illustrate modifications of a body plate section and respectively depicted as plan views.

The production process in the case where the zenith section A depicted in FIG. 3 and the body plate sections B shown in FIG. 8 are used will be described. The V-shaped overlap width 11 of the zenith section A is first of all overlapped along the opposite cut line to bond it, thereby forming a zenith part of a flattened cone as illustrated in FIG. 4.

Body plate sections B-1, B-2, . . . B-12 including from 70° North Latitude to 60° South Latitude are radially arranged around the overlap width 12 provided on and along the circumference of the zenith part 5, as illustrated in FIG. 16, to stick the overlap width 9 provided on the upper edge of each body plate section on the overlap width 12 around the zenith part. The respective overlap widths 7-1, 7-2, . . . 7-12 and 8-1, 8-2, . . . 8-12 protuberantly provided on both right and left edges of the body plate sections B are then folded in the direction of the front surface of each body plate section to bond adjacently body plate sections, for example, the overlap widths 8-1 and 7-1 in the case where the body plate sections B-1 and B-2 are bonded, to each other, thereby forming a rib-like projection 3-1 protuberant along the circle of right ascension on the surface of a sphere. In this manner, the overlap widths of adjacent body plate sections are bonded in turn to each other to form a rib-like projection 3-2, ... 3-12, thereby constructing a hollow spherical shell 2 having an opening 6 at its bottom.

Reinforcing plate D-1, D-2, ... D-12 are respectively stuck further on one side of the thus-formed rib-like projections 3-1, 3-2, ... 3-12.

The respective overlap widths 10-1, 10-2, ... 10-12 protuberantly provided on the bottom edges of the body plate sections are then folded in the direction of the front surface of each body plate section to bond together the overlap widths 10-1 and 10-2 of the adjacent body plate sections, for example, B-1 and B-2 by a flange-reinforcing plate C-1, thereby forming an annular flange 4.

Months and days 16 expressing a calendar for indicating the seasonal positions of constellations drawn on the inner surface of the spherical shell are written on and along the peripheral edge defining the opening 6 of the spherical shell. Both ends of a hanger 14 are last of all attached respectively to the upper ends of opposite rib-like projections.

As illustrated in FIG. 17, a three-dimensional constellation model 1 is rotated and held with both hands in such a manner that numerals corresponding to the observation day among months and days expressing the calendar written on the flange of the three-dimensional constellation model 1 become the lowest. In the case of the northern hemisphere, the position of the polar star 23 in the three-dimensional constellation model is aligned with the direction of the actual polar star.

When looking into the inner surface of the three-dimensional constellation model 1 while maintaining such a state, the celestial map in that season can be seen at almost the same position as that of the actual star in the night sky. When the observation is carried out like this, fixed stars and constellations in the celestial map on the inner surface of three-dimensional constellation model 1 can be compared with actual stars to confirm the fixed stars and constellations.

Since the three-dimensional constellation model according to this invention is provided with a plurality of rib-like projections protuberantly along the circle of right ascension on the surface of a sphere and an annular flange protuberantly along the peripheral edge defining an opening at the bottom of the sphere as described above, an extremely high-mechanical-strength spherical shell can be constructed even when using a relatively thin paper web or plastic film. A three-dimensional constellation model as light as it can easily be held in one hand can hence be obtained.

Furthermore, since the spherical shell is constructed in such a manner that each of the overlap widths provided protuberantly on both side edges of the body plate sections is folded outside and adjacent overlap widths are bonded to each other, its assembly operation is extremely easy and an extremely high-strength spherical shell can also be obtained.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. A three-dimensional constellation model comprising a spherical shell having an opening at the bottom; plate sections each having a ship's bottom-like shape, said plate sections having overlap widths on both it's left and right edges for forming substantially continuous rib-like projections; said a plurality of rib-like projections provided protuberantly along the circle of right ascension on the surface of the spherical shell; a reinforcing plate bonded to each rib-like projection an annular flange provided protuberantly along the peripheral edge defining the opening, the inner surface of said spherical shell being drawn with a celestial map including fixed stars and constellations.

2. A construction kit of a three-dimensional constellation model, the combination of which comprises (a) a zenith section having an external shape of a circular form, the back side of said zenith section being drawn with a celestial map of a zenith part; (b) 6- to 24-in-a-set body plate sections having each a ship's bottom-like shape, each of said body plate sections being provided with an overlap width for boding to the zenith section on its upper edge, overlap widths for forming rib-like projections on its both right and left edges and an overlap width for forming an annular flange on its bottom edge, and being drawn with a serial celestial map on its back side; and (c) a flange-reinforcing plate adapted to bond together the overlap widths provided on the bottom edges of the adjacent body plate sections thereto.

3. The construction kit of the three-dimensional constellation model as claimed in claim 2, wherein the zenith section is formed of a paper or paper-like sheet in the form of a circular disc.

4. The construction kit of the three-dimensional constellation model as claimed in claim 2, wherein the zenith section is formed of a paper or paper-like sheet in the form of a circular disc, in which one to several nicks are cut in its radial direction so as to define their corresponding overlap widths for forming a flattened cone.

5. The construction kit of the three-dimensional constellation model as claimed in claim 2, wherein nicks are cut in the overlap widths for forming the rib-like projections and in the overlap width for forming the annular flange of each body plate section in a direction perpendicular to each edge of the body plate section to divide each of the overlap widths into plural pieces, whereby the body plate sections are allowed to bend so as to form a spherical shell.

6. The construction kit of the three-dimensional constellation model as claim in claim 2, wherein the overlap widths for forming the rib-like projections and overlap width for forming the annular flange of each body plate section are subjected to gathering, whereby the body plate sections are allowed to bend so as to form a spherical shell.

7. The construction kit of the three-dimensional constellation model as claimed in claim 2, wherein nicks are cut in the overlap widths for forming the rib-like projections of each body plate section in a direction perpendicular to each edge of the body plate section to divide each of the overlap widths into plural pieces, whereby the body plate sections are allowed to bend so as to form a spherical shell, and one of individual opposite pieces of the overlap widths divided are made small in size to form inserting overlap width pieces respectively while slits are defined at the centers of folds of the other pieces so that each of the inserting overlap width pieces can be inserted into the slit of the opposite overlap width piece of the adjacent body plate section.

8. The construction kit of the three-dimensional constellation model as claimed in claim 2, wherein (a) the zenith section, (b) the body plate sections and (c) the flange-reinforcing plate have been respectively printed on paper or plastic sheets so as to allow them to be cut out, and perforations have been provided along their contours.

* * * * *